United States Patent
Lobo et al.

(10) Patent No.: US 12,258,463 B2
(45) Date of Patent: Mar. 25, 2025

(54) METHOD OF GEOENGINEERING TO REDUCE SOLAR RADIATION

(71) Applicant: Eastman Kodak Company, Rochester, NY (US)

(72) Inventors: Lloyd Anthony Lobo, Lincoln University, PA (US); Mridula Nair, Penfield, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 581 days.

(21) Appl. No.: 17/586,876

(22) Filed: Jan. 28, 2022

(65) Prior Publication Data

US 2022/0282068 A1 Sep. 8, 2022

Related U.S. Application Data

(60) Provisional application No. 63/155,356, filed on Mar. 2, 2021.

(51) Int. Cl.
*A01G 15/00* (2006.01)
*C08L 1/02* (2006.01)
*G05D 25/00* (2006.01)

(52) U.S. Cl.
CPC ............... *C08L 1/02* (2013.01); *A01G 15/00* (2013.01); *G05D 25/00* (2013.01)

(58) Field of Classification Search
CPC ........... A01G 15/00; C08L 1/02; G05D 25/00
USPC ....................................................... 239/14.1
See application file for complete search history.

(56) References Cited

U.S. PATENT DOCUMENTS

| | | | | |
|---|---|---|---|---|
| 5,194,087 A * | 3/1993 | Berg | ........................ | C09D 1/02 501/134 |
| 5,212,143 A * | 5/1993 | Torobin | .............. | C04B 20/1055 435/395 |
| 5,433,173 A * | 7/1995 | Markles, Jr. | ........... | A01K 61/10 119/231 |
| 5,535,701 A * | 7/1996 | Markels, Jr. | ........... | A01K 61/00 119/231 |
| 5,564,369 A * | 10/1996 | Barber | .................. | A01K 63/006 405/23 |
| 5,651,209 A * | 7/1997 | Rainey | .................... | A01K 97/00 43/44.99 |
| 5,798,307 A * | 8/1998 | Davidovits | ........... | C04B 28/006 423/328.1 |
| 7,754,409 B2 | 7/2010 | Nair et al. | | |
| 7,887,984 B2 | 2/2011 | Nair et al. | | |
| 8,033,879 B2 | 10/2011 | Lambert | | |
| 8,110,628 B1 | 2/2012 | Nair et al. | | |
| 8,220,379 B2 | 7/2012 | Carry | | |
| 8,221,947 B2 | 7/2012 | Lambert et al. | | |
| 8,252,414 B2 | 8/2012 | Putnam et al. | | |
| 8,329,783 B2 | 12/2012 | Nair et al. | | |
| 8,703,834 B2 | 4/2014 | Nair | | |
| 8,728,692 B2 | 5/2014 | Nair et al. | | |
| 9,029,431 B2 | 5/2015 | Nair et al. | | |
| 9,526,216 B2 | 12/2016 | Caldeira et al. | | |
| 9,891,350 B2 | 2/2018 | Lofftus et al. | | |
| 10,233,300 B2 | 3/2019 | Nair et al. | | |
| 10,701,871 B2 | 7/2020 | Field | | |
| 2022/0195090 A1 | 6/2022 | Lofftus et al. | | |
| 2022/0195138 A1 | 6/2022 | Lofftus et al. | | |
| 2022/0195209 A1 | 6/2022 | Loftus | | |
| 2022/0196880 A1 | 6/2022 | Lofftus et al. | | |
| 2022/0204783 A1 | 6/2022 | Lofftus | | |

FOREIGN PATENT DOCUMENTS

JP 5283111 B2 9/2013

OTHER PUBLICATIONS

David Rotman, "A Cheap and Easy Plan to Stop Global Warming," Feb. 8, 2013, www.technologyreview.com, pp. 1-12.
Daisy Dunne, "Explainer: Six ideas to limit global warming with solar geoengineering," CarbonBrief Geoengineering, May 9, 2018.
Nair et al., "Colloids and Surfaces A: Physicochemical and Engineering Aspects," www.elsevier.com, Nov. 21, 2013, 443 (2014) 583-595.
John Latham, "Amelioration of global warming by controlled enhancement of the albedo and longevity of low-level maritime clouds," Atmospheric Science Letters (2002), doi:10.1006/asle.2002.0048.
David W. Keith et al., "Stratospheric solar geoengineering without ozone loss," www.pnas.org, Dec. 27, 2016; 14910-14914, PNAS, vol. 113, No. 52.

* cited by examiner

*Primary Examiner* — Chee-Chong Lee
(74) *Attorney, Agent, or Firm* — J. Lanny Tucker

(57) ABSTRACT

A method to facilitate the reduction of solar radiation impacting Earth proposes the use of a plurality of porous particles that are introduced into Earth's stratosphere at an average distance of at least 10 kilometers above sea level. Each porous particle has a continuous polymeric phase composed of an organic polymer, and discrete pores dispersed within the continuous polymeric phase. Each porous particle has a mode particle size of 2-20 μm; a coefficient of variance (CV) of no more than 20% compared to the mode particle size; and a porosity of 20%-75%. The discrete pores have an average pore size "d" (nm) that is defined by $0.3 \leq d/\lambda \leq 0.8$ wherein $\lambda$ is 400-3,000 nm. Each of the discrete pores of the porous particles is filled with air and optionally a pore stabilizing hydrocolloid that is disposed at the interface of the discrete pore and the continuous polymeric phase.

12 Claims, No Drawings

METHOD OF GEOENGINEERING TO REDUCE SOLAR RADIATION

RELATED APPLICATION

The present application has priority from U.S. Ser. No. 63/155,356 that was filed Mar. 2, 2021.

FIELD OF THE INVENTION

The present invention relates to a method for facilitating the reduction of solar radiation, and especially the reduction of visible and infrared radiation, impacting the Earth's surface. In order words, the present invention relates to a technique of "solar geoengineering" that is believed to potentially impact positive changes in the Earth's warming climate. This invention also relates to a system that can be used to carry out this method.

BACKGROUND OF THE INVENTION

The energy balance between the Earth and the atmosphere is that between incoming solar energy from the Sun and outgoing energy from the Earth. Released solar energy is emitted as shortwave light and ultraviolet energy. When it reaches the Earth, some is reflected back to space by clouds, some is absorbed by the atmosphere, and some is absorbed at the Earth's surface. However, since the Earth is much cooler than the Sun, its radiating energy is much weaker (long wavelength) infrared energy. Essentially 100% of the energy that fuels the Earth comes from the Sun. To maintain a constant global average temperature, all of the Sun's radiation that enters Earth's atmosphere must eventually be sent back to space. This is achieved through the Earth's energy balance by way of energy that is absorbed by land and oceans (~50%); energy that is directly reflected back to space by clouds, the Earth's surface, and different gases and particles in the atmosphere (~30%); and energy that is absorbed by the atmosphere and clouds (~20%). The 70% of solar energy that is absorbed by the Earth's surface, clouds, and atmosphere causes warming and impacts regional climates. Any object or gas that has a temperature emits radiation outward, and this is ultimately re-radiated back into space. These effects occur 24 hours a day.

The absorption of infrared radiation trying to escape from the Earth back to space is particularly important to the global energy balance. Energy absorption by the atmosphere stores more energy near its surface than it would if there was no atmosphere. The average surface temperature of the Earth's moon, which has no atmosphere, is 0° F. (−18° C.). By contrast, the average surface temperature of the Earth is 59° F. (15° C.). This resulting heating effect is called the greenhouse effect. Radiative forcing (RF) represents the extent of the energy imbalance of a planet and is the difference between incoming and outgoing radiation. In the same way that pushing a physical object will cause it to become unbalanced and move, a climate forcing factor (CFF) will change the climate system. When RF results in incoming energy being greater than outgoing energy, the Earth will warm. This represents a positive CFF. Because of the continuing change in the composition of Earth's atmosphere, especially with respect to the increasing concentration of Green House Gases (GHG), the ability of Earth's atmosphere to trap infrared radiation is increasing such that RF is increased to such an extent that Earth's land mass and oceans are gradually being warmed to a potentially harmful extent.

The significant rise in the concentration of GHG coincides with the start of the industrial revolution and as such the recent rise in average global temperatures is termed as "anthropomorphic climate change." Notice of this effect has occurred for several decades and the resulting impact on regional and worldwide climates, polar ice caps, agriculture, and many socioeconomic behaviors and systems can be noticed even if not totally quantified. The end result of worldwide studies of these phenomena is a call for humanity to find ways to reduce the negative effects using all possible resources and ingenuity to bring average Earth surface temperature more in line with what can reasonably sustain population growth and socioeconomic needs including agricultural needs. The primary efforts recommended by the Intergovernmental Panel on Climate Change are directed to a reduction of net GHG emissions to levels that will best sustain life on Earth. However, economists and political scientists recognize that these efforts come with a price (or cost) to economic prosperity of global citizens. In the face of this reality, scientists have begun efforts to reduce radiative forcing using geoengineering means, one of which being Solar Radiation Management (SRM).

U.S. Pat. No. 8,033,879 (Lambert) provides a considerable discussion of the problem of climate change and the various attempts by researchers around the world to intervene using what are known as "geoengineering" or "terraforming" efforts including "solar geoengineering." Some efforts have been clearly found to be hazardous, harmful, or fruitless in some respect. Other efforts are not easily evaluated or at least the results cannot yet be properly analyzed.

SRM, having the goal of reducing solar radiation that is received by Earth's surface and its atmosphere, has been gaining attention for offsetting warming trends largely caused by GHG released into the atmosphere by both natural and man-made processes. SRM is being suggested as an approach to managing some of the consequences of climate change. Whitening clouds (increasing their albedo) by spraying seawater into the air, making surfaces (such as buildings and crops) more reflective, injecting radiation reflective particles or acids into the stratosphere, or putting radiation shading materials into space have been proposed and may offer the potential of increasing Earth's reflectivity to some extent, thereby offsetting some warming caused by GHG. So far, however, such techniques have not reached expected potential and they appear unlikely to have the potential for sufficient scalability to be very effective.

Stratospheric based methods adapted for the purposes of SRM also include the injection of aerosol particles into Earth's stratosphere to cause a reflection of solar radiation by those aerosol particles back into space. This effort has been prompted by the natural and measurable cooling effects caused by the extreme volcanic eruptions in recent centuries that ejected sulfur, sulfate particles, and various types of debris into the stratosphere. To be sustainable and effective for the cooling purpose, however, such methods require long-term, uninterrupted continued ejection on the scale of tens of kilograms of material per second. It is known that any cooling caused by volcanic eruptions typically dissipates after a few years. Temporary or intermittent efforts in this regard are is clearly insufficient for the purpose of long-term climate cooling, and the sustained presence of such ejected materials also are known to cause numerous harmful effects.

Stratospheric reflectors have scalability as well as the technology to accomplish significant reduction in insulative effect at a reasonable cost. However, there are several concerns regarding this proposed technology that are discussed below For example, the injection of sulfur or sulfates into the stratosphere, at least at a sustained level, has the potential of damaging the ozone layer surrounding Earth by catalytically enhancing the formation of nitrogen, chlorine, and bromine compounds that react with and reduce the concentration of ozone that is a very beneficial and critical feature of Earth's atmosphere. Such chemicals also likely precipitate in acid rain. Moreover, there has been some modeling studies that suggest the sulfate-based aerosols could decrease rainfall in Asia and Africa during monsoon seasons, which would then adversely affect agriculture and food supplies.

In addition, sulfate-based aerosol particles will eventually drop to Earth's surface and potentially cause harmful effects on both water and land, including increasing respiratory health hazards. In order to keep aerosol particles suspended indefinitely (or for a long time), particle size must be in the low nanometer range. Such nanoparticles, however, could adversely affect ultraviolet radiation that is important to photosynthesis, thus potentially reducing crop yields on Earth.

Others have suggested the injection of microparticulate olivine, mica, or diatomaceous earth into the stratosphere to avoid the ill effects of injecting sulfate-based particles in the stratosphere. But according to U.S. Pat. No. 8,033,879 (noted above), there are doubts as to the feasibility and safety of such approaches.

As there is growing research in the field of solar geoengineering, no one approach has captured economic, political, academic, and industrial attention sufficiently to give confidence that climate change and attendant overall warming of Earth's surface can be readily mitigated using any of the known approaches and technologies. Thus, there is a continuing and urgent need to address these problems with new or improved concepts that can be readily modeled without extensive and expensive actual trials, can be readily scaled to produce industrial quantities of needed mitigating materials, and can be shown to potentially have the desired effect of reducing the amount of solar radiation onto Earth's surface.

SUMMARY OF THE INVENTION

The present invention is designed to provide a unique approach to solar geoengineering in addressing the climate change problem described above while minimizing the problems accompanying known techniques.

Thus, the present invention provides a method of geoengineering to facilitate the reduction of solar radiation impacting Earth's surface, the method comprising:
  introducing a plurality of porous polymeric particles into Earth's stratosphere at an average distance of at least 10 kilometers above sea level,
    wherein each of the plurality of porous particles comprises a continuous polymeric phase composed of one or more organic polymers, and discrete pores dispersed within the continuous polymeric phase, and
    each of the plurality of porous particles has the following properties:
      a mode particle size of at least 2 μm and up to and including 20 μm;
      a coefficient of variance of the particle size of no more than 20% compared to the mode particle size; and
      a porosity of at least 20% and up to and including 75%; and
      the discrete pores have an average pore size d (in nanometers) that is defined using the equation: $0.3 \leq d/\lambda \leq 0.8$ wherein $\lambda$ is at least 400 nm and up to and including 3,000 nm; and
    wherein each of the discrete pores is filled with air and optionally contains a pore stabilizing hydrocolloid that is disposed at the interface of the discrete pore and the continuous polymeric phase.

In addition, the present invention provides a system for solar geoengineering to facilitate the reduction of solar radiation impacting Earth's surface, the system comprising:
  a plurality of porous polymeric particles; and a means for dispersing the plurality of porous particles into Earth's stratosphere at an average distance of at least 10 kilometers above sea level, wherein each of the plurality of porous particles comprises a continuous polymeric phase composed of one or more organic polymers, and discrete pores dispersed within the continuous polymeric phase, and each of the plurality of porous particles has the following properties:

a mode particle size of at least 2 μm and up to and including 20 μm;

a coefficient of variance of the particle size of no more than 20% compared to the mode particle size; and a porosity of at least 20% and up to and including 75%; and the discrete pores have an average pore size d (in nanometers) that is defined by the equation: $0.3 \leq d/\lambda \leq 0.8$ wherein λ is at least 400 nm and up to and including 3,000 nm; and wherein each of the discrete pores is filled with air and optionally contains a pore stabilizing hydrocolloid that is disposed at the interface of the discrete pore and the continuous polymeric phase.

The present invention potentially provides a number of advantages over known solar geoengineering techniques. These advantages are achieved by introducing uniquely engineered porous particles into Earth's stratosphere at an elevation of at least 10 kilometers above sea level to potentially reflect visible and infrared radiation back into space while allowing ultraviolet radiation to pass to Earth's surface.

In general, when light strikes a surface, some of it may be reflected, some absorbed, some scattered, and the rest is transmitted. Reflection can be diffuse, such as light reflecting off a white wall, or specular, as in light reflecting off a mirror. Typical white inorganic pigments such as titanium dioxide scatter light as a result of refractive index differences between the inorganic pigment and the surroundings influenced by the pigment size. In the porous polymer particles used according to this invention, the large difference in refractive indexes between the entrapped air in the discrete pores and the continuous polymeric phase of the porous particles causes incident electromagnetic radiation striking each porous particle to be scattered by the multiplicity of interfaces and discrete pores. The back-scattered electromagnetic radiation can again be scattered and returned in the direction of the incident electromagnetic radiation and contribute to the overall "reflection" of radiation by the porous particle. The uniquely engineered porous particles according to the present invention have a number of designed properties to enable their effectiveness for the described purpose of scattering and reflecting visible and infrared electromagnetic radiation while minimizing absorption or reflection of UV radiation.

Firstly, the porous particles are designed to have desired porosity, narrow particle size distribution, and discrete pores of controlled size to impart desired density and aerodynamic properties to keep the porous particles suspended in the stratosphere at a desired distance from Earth as long as possible after they are introduced there, and to optimize their selective radiation reflective properties. In addition, the shape (aspect ratio) and density of the porous particles can be controlled to facilitate desired aerodynamic properties. For example, the porous particle density is generally low because of designed porosity, so as to keep them buoyant or suspended within the stratosphere as long as possible.

The ability to produce and use porous particles whose real diameter is several times larger than the known particles proposed for this purpose, both having similar aerodynamic diameters, solves a significant challenge of using known particles of small diameter that tend to form clumps due to surface interactions. That is, the unique porous particles used in the present invention will be easier to handle, disperse, and locate in the stratosphere relative to much smaller particles that are generally being considered in the field of solar geoengineering.

The discrete pores in the porous particles used in the practice of the present invention are generally "closed" (vesiculated, or not open to the porous particle surface) and have a designed average size and spacing within the porous particle volume to optimize optical effectiveness for diffuse reflection of light and specifically in the amount and type of reflected radiation. For example, the porous particles can be designed with a combination of physical properties to desirably reflect visible and infrared radiation while letting critical ultraviolet radiation to pass to Earth's surface.

If desired, the porous particles can be surface treated to provide chemical functionality and thereby reduce agglomeration prior to deposition in the stratosphere which agglomeration would cause them more readily to fall to Earth and lose their effectiveness for solar geoengineering.

In many embodiments, the porous particles used according to the present invention can be prepared from a variety of organic polymeric materials including bioplastics that may be environmentally friendly.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

The terms "porous particle" and "porous particles" are used herein, unless otherwise indicated, to refer to generally spherical, porous organic polymeric particles. The porous particles generally comprise a solid continuous organic polymeric phase having an external polymeric surface and discrete pores dispersed within the continuous polymeric phase. The continuous polymeric phase also can be chemically crosslinked or elastomeric in nature, or both chemically crosslinked and elastomeric in nature.

The continuous polymeric phase of the porous particles generally has the same organic polymer composition throughout that solid phase. That is, the continuous polymeric phase is generally uniform in composition. In addition, if mixtures of organic polymers are used in the continuous polymeric phase, generally those mixtures also are uniform throughout.

As used in this disclosure, the term "isolated from each other" refers to the different discrete pores of same or different sizes being separated from each other by some portion of the continuous polymeric phase, and such discrete pores are generally not interconnected. Thus, "discrete" pores refer to "individual" or "closed," non-connected pores or voids distributed within the continuous polymeric phase. The average size of the discrete pores is described below. While there can be a few open pores (craters) on the surface of the porous particles, such open pores are not desirable and are present only by accident and minimized as much as possible by careful regulation of manufacturing conditions and materials as described below. The size of the porous particles, their formulation, and manufacturing conditions, as described below, are the primary controlling factors for discrete pore size and distribution throughout the continuous polymeric phase. Whatever the size of the discrete pores, they are generally distributed randomly throughout the continuous polymeric phase.

The manufacturing methods described below for preparing porous particles according to the present invention generate a large number of porous particles, thereby forming a "plurality" or "ensemble" of porous particles. One porous particle is not practically made or used in the present invention, and a "plurality" is not limited in the number of individual porous particles but can reasonably represent thousands, millions, and even hundreds of millions of individual porous particles.

In the practice of the present invention, the "plurality" of porous particles used can have the same chemical composition, for example, from the same manufacturing batch or operation. Alternatively, the "plurality" of porous particles can be derived by mixing porous particles prepared using different organic polymers or other chemical components or porous particles of different pore sizes prepared in different manufacturing batches or operations.

Unless otherwise noted herein, the following terms have the noted definitions:

The term "UV radiation" is meant to refer to electromagnetic radiation of at least 100 nm and up to and including 400 nm;

The term "visible radiation" is meant to refer to electromagnetic radiation of at least 400 nm and up to and including 760 nm; and The terms "near-infrared radiation" and "infrared radiation" are meant to refer to electromagnetic radiation have a wavelength of at least 800 nm.

Uses

As described in more detail above and hereinbelow, the method and system of the present invention utilize porous particles described herein that are believed to be useful for reflecting solar radiation, especially radiation of visible and infrared radiation (for example, radiation having a wavelength of at least 400 nm and up to and including 3,000 nm) when the porous particles are dispersed or injected high into Earth's stratosphere.

Porous Particles

Porous particles used in the present invention containing discrete pores are generally prepared using one or more water-in-oil emulsions in combination with an aqueous suspension process, such as in the Evaporative Limited Coalescence (ELC) process that is known in the art. Details for the preparation of the porous particles and exemplary working examples for making same are provided, for example, in U.S. Pat. No. 7,887,984 (Nair et al.); U.S. Pat. No. 8,110,628 (Nair et al.); U.S. Pat. No. 8,703,834 (Nair); U.S. Pat. No. 7,754,409 (Nair et al.); U.S. Pat. No. 7,887,984 (Nair et al.); U.S. Pat. No. 8,329,783 (Nair et al.); U.S. Pat. No. 8,252,414 (Putnam et al.); and publications noted therein relating to such polymerization processes, the disclosures of all of which are incorporated herein by reference.

In general, the ELC process can be used to prepare porous particles using a three-step process.

The first step involves the formation of a stable water-in-oil emulsion, including a first aqueous phase of a pore stabilizing hydrocolloid dispersed finely in a continuous oil phase containing one or more organic polymers described in more detail below, dissolved in a suitable organic solvent or a mixture of organic solvents. The first aqueous (water) phase creates the discrete pores in the resulting porous particles, and the amount and type pore stabilizing hydrocolloid in conjunction with the ionic strengths of the first and second aqueous phases of the water-in-oil-in-water emulsion, control the discrete pore size and number of discrete pores in the resulting porous particles, while stabilizing the discrete pores so that the resulting porous particles are not brittle or fractured easily. The size of the discrete pores in turn impacts the wavelengths of light that is scattered, reflected, and transmitted.

Thus, pore stabilizing hydrocolloids can be present within at least part of the volume of the formed discrete pores distributed throughout the continuous polymeric phase, for example at the interface of each discrete pore and the continuous polymeric phase. An extensive list of such useful pore stabilizing hydrocolloids is provided in the Nair, Nair et al., and Putnam et al. patents cited above in this section. In some embodiments, the same pore stabilizing hydrocolloid can be incorporated in essentially all the discrete pores throughout the entire porous particles. For example, useful pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

The amount of pore stabilizing hydrocolloids used in the first step of making the porous particles will depend upon the amount of porosity and discrete pore size desired and the molecular weight of the pore stabilizing hydrocolloid. For example, the amount can be on the order of at least 0.5 weight % and up to and including 20 weight %, based on the weight of the continuous polymeric phase polymer(s), and particularly if the pore stabilizing hydrocolloid is CMC. A skilled worker can readily determine the optimal amount of pore stabilizing hydrocolloid to use in order to achieve the desired porous particle properties (porosity and average pore size) required for the present invention.

The first aqueous phase can additionally contain, if desired, salts to buffer the first aqueous phase and to optionally control the osmotic pressure of the first aqueous phase. For example, when CMC is used, the osmotic pressure can be increased by buffering using a pH 7 phosphate buffer. The first aqueous phase can also contain an additional porogen or discrete pore forming agent such as ammonium carbonate.

It can be desired in some embodiments to provide additional stability of the formed discrete pores in the porous particles during their formation, by having one or more amphiphilic block copolymers disposed at the interface of the formed discrete pores and the continuous polymeric phase. Such materials are "low HLB" materials, meaning that they have an HLB (hydrophilic-lipophilic balance) value as it is calculated using known science, of 6 or less, or even 5 or less. The details of these amphiphilic polymers and their use in the preparation of the porous particles are provided in U.S. Pat. No. 9,029,431 (Nair et al.), the disclosure of which is incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

The continuous polymeric phase is generally polymeric and organic in nature and non-porous particles (having less than 5% porosity) are excluded from use in the present invention. Smaller inorganic particles can be present on the outer surface as noted below.

The porous particles are composed of a continuous polymeric phase derived from one or more organic polymers that are chosen so that each one is capable of being dissolved in an organic solvent that is immiscible with water and the organic polymer(s) are also substantially insoluble in water. Useful organic polymers include but are not limited to, vinyl polymers such as those derived from ethylenically unsaturated polymerizable monomers such as styrene monomer, and condensation polymers prepared by condensation reactions using appropriate reactants. Representative organic polymers include homopolymers and copolymers such as polyesters, polystyrenes, polyolefins, vinyl esters, α-methylene aliphatic monocarboxylic acid esters, vinyl ethers, vinyl ketones, polyurethanes, epoxy resins, silicone resins, and polyamides. Particularly useful polyesters include those prepared from aromatic or aliphatic dicarboxylic acids and aliphatic diols or triols, and such polyesters generally have an acid value (milligrams of potassium hydroxide per gram of polymer) are in the range of at least 2 and up to and including 100.

In addition, the continuous polymeric phase can have a glass transition temperature ($T_g$) of greater than 80° C., or more typically of at least 100° C. and up to and including 180° C., or more likely at least 110° C. and up to and including 170° C. as determined using Differential Scanning calorimetry and known techniques. For many commercially available organic materials, the glass transition temperatures are known from the suppliers. Organic polymers having a $T_g$ that is greater than 200° C. are typically less useful in the continuous polymeric phase.

Moreover, the continuous polymeric phase can comprise one or more organic polymers, each of which has a viscosity of at least 80 centipoises (80 mPa-sec) and up to and including 500 centipoises (500 mPa-sec) at a shear rate of 100 sec$^{-1}$ as measured in ethyl acetate at a concentration of 20 weight % at 25° C.

For example, polymer viscosity (in centipoise or mPa-sec) of the organic polymer(s) composing the continuous polymeric phase can be measured in ethyl acetate at concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

In particularly useful embodiments, the continuous polymeric phase can comprise one or more organic polymers having the properties noted above and be composed of one or more cellulosic polymers including but not limited to, those cellulosic polymers derived from one or more (for example, a combination) of cellulose acetate, cellulose butyrate, cellulose acetate butyrate, and cellulose acetate propionate. A cellulosic polymer derived solely or at least in part from cellulose acetate butyrate is particularly useful to form the continuous polymeric phase. Mixtures of these cellulose polymers can also be used if desired, and mixtures comprising a polymer derived from cellulose acetate butyrate as at least 80 weight % of the total of cellulosic polymers (or of all polymers in the continuous polymeric phase) are particularly useful mixtures.

As noted above, any suitable organic solvent or mixture thereof, that will dissolve the one or more organic polymers can be used in the manufacture of the porous particles. For the particularly useful cellulosic polymers, a useful organic solvent is ethyl acetate, propyl acetate, or a mixture thereof. Their volatility is such that they are readily removed from the oil phase droplets as described below, by evaporation.

Any type of mixing and shearing equipment can be used to perform the first step used to prepare the porous particles, including but not limited to, a batch mixer, planetary mixer, single or multiple screw extruder, dynamic or static mixer, colloid mill, high pressure homogenizer, sonicator, or a combination thereof. The temperature of the first step can be modified to achieve the optimum viscosity for emulsification of the droplets and to control organic solvent evaporation.

The second step in the formation of the porous particles generally involves forming a water-in-oil-in-water emulsion by dispersing the above-mentioned water-in-oil emulsion in a second aqueous phase containing a colloidal stabilizer for example inorganic or organic particles such as, colloidal silica, or latex particles in a modified ELC process. Specifically, in the second step of the process, the water-in-oil emulsion is mixed with the second aqueous phase containing a suitable colloidal stabilizer to form an aqueous suspension of droplets that are subjected to shear or extensional mixing or similar flow processes, preferably through an orifice device to reduce the droplet size, yet above the particle size of the first water-in-oil emulsion, and to achieve a narrow size distribution of droplets through the limited coalescence process. The pH of the second aqueous phase is generally between 4 and 7 when using colloidal silica as the colloidal stabilizer.

For the second step to form the water-in-oil-in-water emulsion, the shear or extensional mixing or flow process is controlled in order to prevent disruption of the water-in-oil emulsion and droplet size reduction is achieved by homogenizing the water-in-oil emulsion through a capillary orifice device, or other suitable flow geometry. The range of back pressure suitable for producing acceptable particle size and size distribution is between 100 psi (689.4 kPa) and 5000 psi (34470 kPa), and the best flow rate is between 1000 ml/min and 6000 ml/min.

The final size of the porous particles, the final size of the discrete pores, and the surface morphology of the porous particles may be impacted by the osmotic mismatch between the osmotic pressure of the first aqueous phase, the oil phase, and the second aqueous phase.

Further details about controlling osmotic pressures during the second step and the effects on the resulting porous particle properties, are provided in Column 7 (line 56) to Column 8 (line 28) of U.S. Pat. No. 7,887,984 (noted above).

The third step in the preparation of the porous particles generally involves removal of both the organic solvent(s) used to dissolve the organic polymer(s) used to form the continuous polymeric phase and most of the first aqueous phase so as to produce an aqueous suspension of porous particles. The rate, temperature, and pressure used during drying will also impact the final porous particle size and surface morphology. Clearly the details of this process depend upon the water solubility and boiling point of the organic (oil) phase relative to the temperature of the drying process. Organic solvent removal apparatus such as a rotary evaporator or a flash evaporator can be used in the preparation of the porous particles. The porous particles can then be isolated after removing the water and any organic solvents by filtration or centrifugation, followed by drying in an oven at for example 40° C. that also removes any water remaining in the discrete pores from the first aqueous phase. Optionally, the porous particles can be treated with an alkali to remove any colloidal silica stabilizer.

Optionally, the third step can be preceded by the addition of additional water prior to removal of the solvents, isolation, and drying operations.

Alternatively, in the process used to prepare porous particles, the pore stabilizing hydrocolloid can be emulsified in one or more water-immiscible ethylenically unsaturated polymerizable monomers and a polymerization initiator to form the first water-in-oil emulsion. This oil emulsion can then be dispersed in water containing a suitable pore stabilizing hydrocolloid as described above for the second step to form a water-in-oil-in-water emulsion for example using the limited coalescence process. The ethylenically unsaturated polymerizable monomers are then polymerized in the third step for example through the application of heat or radiation. The resulting suspension of polymerized porous particles can be isolated and dried as described above to yield useful porous particles. In addition, the one or more ethylenically unsaturated polymerizable monomers can also contain one or more organic polymers described above.

In general, each of the plurality of porous particles used in the present invention has a mode particle size representing the peak of the number weighted frequency distribution, of at least 2 μm or at least 4 μm, and up to and including 12 μm, up to and including 15 μm, or up to and including 20 μm. Mode particle size represents the most frequently occurring diameter for spherical particles and the most frequently occurring largest chord length for any non-spherical particles in a particle size distribution histogram, which can be determined using known equipment (such as the Sysmex FPIA 3000 Flow Particle Image Analyzer that uses image analysis measurements and that can be obtained from various sources including Malvern Panalytical); and commercially available coulter counters that use the conductivity contrast between the particles and the surrounding electrolyte as each particle passes through a narrow orifice, and other particle characterizing equipment, software, and procedures. The use of the Sysmex FPIA 3000 Flow Particle Image Analyzer is particularly desired. Details about this apparatus and its use are provided in Column 10 (lines 30-40) of U.S. Pat. No. 7,887,984 (noted above).

In addition, the preparatory method described above is used to prepare porous particles according to this invention wherein each exhibits a coefficient of variance (CV) of the particle size of no more than 20%, or no more than 15%, or even no more than 10%, compared to the mode particle size. In particular, the CV can be between 10% and 15% including the end points of this range. The coefficient of variance is calculated from the width index (WI) of the log normal distributions that can be determined using a sizing apparatus such as the noted Beckman Multisizer 3 Coulter Particle Analyzer. The WI is defined as 1+CV and is determined from the ratio of the log normal distribution of the porous particle diameter of 84% of the plurality of porous particles divided by the porous particle size diameter of 50% of the porous particles.

In addition, each of the plurality porous particles used in the practice of this invention generally has a porosity of at least 20 volume % and up to and including 75 volume %, or likely at least 35 volume % and up to and including 65 volume %, or more typically at least 40 volume % and up to an including 60 volume %, all based on the total porous particle volume. Porosity of porous particles is a measure of the total volume of voids divided by the total volume of a particle. Porosity can be measured using various known industrial techniques and apparatus including but not limited to, "computed tomography" (CT) scanning, industrial 3D imaging, and by the known mercury intrusion procedure. Apparatus for this purpose is available from various commercial sources.

The extent of porosity in the particles used in the practice of the present invention can also be determined using a combination of diameter sizing as described earlier and "time-of flight" method. The time-of-flight method used to determine the extent of porosity of the particles used in the present invention includes the use of an Aerosizer particle measuring system that measures particles sizes by their time-of-flight in a controlled environment. This time of flight depends critically on the density of the material of which the particle is composed and its projected area in the stream. If the material measured with the Aerosizer has a lower density or a higher density, then the calculated diameter distribution will be shifted artificially low or high, respectively. Independent measurements of the true particle size distribution via alternate methods (for example, using a Coulter counter) can then be used to fit the Aerosizer data with particle density as the adjustable parameter. The outside diameter particle size distribution is first measured using the Coulter particle measurement systems. The mode of the volume diameter distribution is chosen as the value to match with the Aerosizer volume distribution. The same particle distribution is measured with the Aerosizer and the apparent density of the particles is adjusted until the mode (D50%) of the two distributions matches. The ratio of the calculated and solid particle densities is taken to be the extent of porosity of the particles. The porosity values generally have uncertainties of +/−10%.

The discrete pores in the porous particles are designed using the details and compositional features described herein to each have an average pore size "d" (in nanometers) that is defined by the equation of 0.3≤d/λ≤0.8, wherein λ represents electromagnetic wavelengths of at least 400 nm and up to and including 3,000 nm, and thus representing electromagnetic radiation generally greater than ultraviolet and up to and including infrared radiation. These discrete pores are generally filled only with air but there can be a pore stabilizing hydrocolloid or an amphiphilic block copolymers, or both, (as described above) disposed at the interface of each discrete pore and the continuous polymeric phase for the reasons noted above. In some embodiments, no colorants or other additives that would affect the desired absorption or reflection of radiation at least 400 nm are purposely included within the discrete pores.

However, in other instances, it may be beneficial to introduce some level of colorants into the porous particles. Incorporating various colored pigments primarily in the internal discrete pores is described in U.S. Pat. No. 8,252, 414 (noted above). In general, scattering and reflection of radiation are the preferred modes of attenuating incoming solar radiation reaching the earth. Absorption on the other hand, results in transforming electromagnetic radiation into thermal energy resulting in radiation of long wavelengths in the infrared region of the electromagnetic spectrum. However, since the porous particles used in accordance with the present invention are to be deployed well above the earth's surface in the stratosphere, the consequences of thermal radiation to earth's energy balance are minimal since most of the thermal radiation from these porous particles will be radiated back into space away from the earth. In the event that the back scattering and reflection in certain wavelengths are insufficient to attenuate solar radiation, strategic coloration of the porous particles can be employed based on the wavelengths of radiation that are not effectively scattered or reflected. A significant portion of the sun's radiation spectrum near the stratosphere (about 40% based on the energy) lies in the infrared region of the electromagnetic spectrum (for example, in the range of from 800 nm to and including 2500 nm) The IR portion of the spectrum is the most challenging to scatter. Therefore, most desired colorants useful for this purpose would be those that absorb in the noted infrared spectral region in general.

The porous particles used in the practice of the present invention can be spherical or non-spherical but they are generally spherical or "near" spherical in shape, as defined below by the noted aspect ratio. If desired, shape control agents can be incorporated into the first or second aqueous phases, or into the oil phase to modify the shape, aspect ratio, or morphology of the resulting porous particles. The shape control agents can be added prior to or after forming the water-in-oil-in-water emulsion in the second step. In either case, the interface at the oil phase and the second water phase can be modified before the organic solvent(s) is removed in the third step, resulting in a reduction in sphericity of the resulting porous particles. Further details about shape control and useful materials are described for example, in U.S. Pat. No. 7,887,984 (noted above), and in the patent applications cited in Col. 9 thereof, the disclosures of all of which are incorporated herein by reference.

It is also desired for most embodiments of the present invention that each of the porous particles used in the practice of the present invention has a particle shape that is non-spherical and is characterized by an aspect ratio of less than 0.80, or less than 0.74, and even less than 0.70. The geometric mean aspect ratio $R_x$ is defined as:

$$R_x = \sqrt{R_b R_c}$$

wherein $R_b$ represents the major aspect ratio reported by the Sysmex FPIA-3000 size analyzer described below and $R_c$ represents the ellipsoidal equivalent minor aspect ratio $R_c$ computed as described above. Aspect ratio, in other words, is the ratio of the shortest dimension to the longest dimension of a porous particle. The variation of aspect ratio changes the shape of porous particles. Aspect ratio of the porous particles which has an impact on the aerodynamic lift of the porous particles, can be determined using the Sysmex FPIA-3000 automated particle shape and size analyzer from Malvern Instruments. Samples pass through a sheath flow cell that transforms the porous particle suspension into a narrow or flat flow, ensuring that the largest area of the porous particle is oriented towards the camera and that all porous particles are in focus. The CCD camera captures 60 images every second and these are analyzed in real time. Numerical evaluation of porous particle shape is derived from measurement of the area of the porous particle. A number of shape factors are calculated, including circularity, aspect ratio, and circle equivalent diameter. Values of less than unity for aspect ratio and circularity indicate porous particle shapes that are not exactly spherical.

The plurality of porous particles used in the practice of this invention can be provided as powders, or as aqueous suspensions (including water or water with water-miscible organic solvents such as alcohols). Such powders and aqueous suspensions can also include surfactants or suspending agents to keep the porous particles suspended or for rewetting them in an aqueous medium before use in the geoengineering processes described below. A useful surfactant for this purpose, for example, is a $C_{12}$-$C_{14}$ secondary alcohol derivative of poly(ethylene oxide) that can be commercially available as TERGITOL® 15-S-7 (Dow Chemical Corporation). The other compositional and procedural details are described above in the description provided in the incorporated Nair, Nair et al., and Putnam et al. US patents described above. In order to make these porous particles amenable to easy dispersal it can be useful to subject the porous particles to a surface treatment as described in U.S. Pat. No. 8,728,692 (Nair et al.), the disclosure of which is incorporated herein by reference, wherein the surface of the porous particle has fine inorganic particles on the outer surface of the porous particle phase, which fine inorganic particles are sometimes known as "small inorganic stabilizer particles" that are colloidal in size. Such fine inorganic particles have hydrophobic groups covalently bonded primarily on portions of surfaces of the fine inorganic particles positioned away from the porous particle. This makes the porous particles hydrophobic and, depending upon the choice of the hydrophobic groups, avoids the formation of hard agglomerates in the dry state. Useful fine inorganic particles can for example comprise one or more metal oxides or silica.

U.S. Pat. No. 8,221,947B2 (Lambert et al.) and references contained therein, the disclosures of all of which are incorporated herein by reference, describe various materials and other methods including mechanical agitation to add treatment of hydrophobic materials to the surface of toner particles for improving their dry flow. Such technology can be used also to treat the porous particles used in the practice of this invention and to impart improved dry flow ability to them.

Method of Geoengineering

A plurality of porous particles can be used to facilitate the reduction of solar radiation impacting Earth's surface by introducing the plurality of the porous particles (perhaps millions of such porous particles) into Earth's stratosphere at an average distance of at least 10 kilometers, or even higher, above sea level. The altitude at which the porous particles are introduced must be such that the reflected light from the porous particles has the least amount of impact on heating Earth's atmosphere. If the altitude is too low then a substantial amount of radiation will interact with the Earth's atmosphere making their management less effective. If it is too high the ability to contain the porous particles at this rarefied atmosphere may be too expensive and they may be less effective.

This method can be carried out using the plurality of porous particles described herein and any suitable means for dispersing the plurality of porous particles into Earth's atmosphere as noted above, forming a system for geoengineering for the noted purposes.

For example, the plurality of porous particles could be introduced into the stratosphere as noted above using aircraft, artillery or high-altitude balloons as are commonly proposed by researchers in this field, but there is no practical limit to such means for introducing the porous particles and the ingenuity and knowledge of researchers in this field will provide other means that are not explicitly described here.

Thus, the present invention can be practiced using one or more of the following embodiments:

1. A method of geoengineering to facilitate the reduction of solar radiation impacting Earth's surface, comprises:
   introducing a plurality of porous polymeric particles into Earth's stratosphere at an average distance of at least 10 kilometers above sea level,
   wherein each of the plurality of porous particles comprises a continuous polymeric phase composed of one or more organic polymers, and discrete pores dispersed within the continuous polymeric phase, and
   each of the plurality of porous particles has the following properties:
   a mode particle size of at least 2 μm and up to and including 20 μm;
   a coefficient of variance of the particle size of no more than 20% compared to the mode particle size; and
   a porosity of at least 20% and up to and including 75%; and
   the discrete pores have an average pore size d (in nanometers) that is defined using the equation: $0.3 \leq d/\lambda \leq 0.8$ wherein λ is at least 400 nm and up to and including 3,000 nm; and
   wherein each of the discrete pores is filled with air and optionally contains a pore stabilizing hydrocolloid that is disposed at the interface of the discrete pore and the continuous polymeric phase.

2. The method of embodiment 1, wherein each of the plurality of porous particles comprises a continuous polymeric phase composed of one or more cellulosic polymers.

3. The method of embodiment 1 or 2, wherein each of the plurality of porous particles comprises a continuous polymeric phase composed of a cellulosic polymer derived at least in part from cellulose acetate butyrate.

4. The method of any of embodiments 1 to 3, wherein each of the plurality of porous particles has a mode particle size of at least 2 μm and up to and including 15 μm.

5. The method of any of embodiments 1 to 4, wherein each of the plurality of porous particles has a mode particle size of at least 4 μm and up to and including 12 μm.

6. The method of any of embodiments 1 to 5, wherein each of the plurality of porous particles has a coefficient of variance of the particle size of no more than 15% compared to the mode particle size.

7. The method of any of embodiments 1 to 6, wherein each of the plurality of porous particles has a coefficient of variance of the particle size of no more than 10% compared to the mode particle size.
8. The method of any of embodiments 1 to 7, wherein each of the plurality of porous particles has an aspect ratio of at less than 0.8 and up to and including 1.
9. The method of any of embodiments 1 to 8, wherein each of the plurality of porous particles further comprises one or more colorants.
10. The method of embodiment 9, wherein the one or more colorants absorb radiation having a wavelength of at least 800 nm and up to and including 2500 nm of the electromagnetic spectrum.
11. The method of any of embodiments 1 to 10, wherein the plurality of porous particles comprise fine inorganic particles on the outer surfaces thereof, which fine inorganic particles have hydrophobic groups covalently bonded primarily on portions of surfaces of the fine inorganic particles positioned away from the porous particle surfaces.
12. A system for solar geoengineering to facilitate the reduction of solar radiation impacting Earth's surface using the method of any of embodiments 1 to 11, the system comprising:

a plurality of porous polymeric particles; and a means for dispersing the plurality of porous particles into Earth's stratosphere at an average distance of at least 10 kilometers above sea level, wherein each of the plurality of porous particles comprises a continuous polymeric phase composed of one or more organic polymers, and discrete pores dispersed within the continuous polymeric phase, and each of the plurality of porous particles has the following properties:

a mode particle size of at least 2 μm and up to and including 20 μm;

a coefficient of variance of the particle size of no more than 20% compared to the mode particle size; and a porosity of at least 20% and up to and including 75%; and the discrete pores have an average pore size d (in nanometers) that is defined by the equation: $0.3 \leq d/\lambda \leq 0.8$ wherein $\lambda$ is at least 400 nm and up to and including 3,000 nm; and wherein each of the discrete pores is filled with air and optionally filled with a pore stabilizing hydrocolloid that is disposed at the interface of the discrete pore and the continuous polymeric phase.

The invention has been described in detail with particular reference to certain preferred embodiments thereof, but it will be understood that variations and modifications can be effected within the spirit and scope of the invention.

The invention claimed is:

1. A method of geoengineering to facilitate the reduction of solar radiation impacting Earth's surface, comprises:

introducing a plurality of porous polymeric particles into Earth's stratosphere at an average distance of at least 10 kilometers above sea level, wherein each of the plurality of porous particles comprises a continuous polymeric phase composed of one or more organic polymers, and discrete pores dispersed within the continuous polymeric phase, and each of the plurality of porous particles has the following properties:

a mode particle size is a number within the range of at least 2 μm and up to and including 20 μm, wherein the mode particle size represents the most frequently occurring diameter for spherical particles and the most frequently occurring largest chord length for any non-spherical particles in a particle size distribution histogram for the plurality of porous particles;

a coefficient of variance of the particle size of no more than 20% compared to the mode particle size; and a porosity of at least 20% and up to and including 75%; and the discrete pores have an average pore size d (in nanometers) that is defined using the equation: $0.3 \leq d/\lambda \leq 0.8$ wherein $\lambda$ is at least 400 nm and up to and including 3,000 nm; and wherein each of the discrete pores is filled with air.

2. The method of claim 1, wherein each of the plurality of porous particles comprises a continuous polymeric phase composed of one or more cellulosic polymers.

3. The method of claim 1, wherein each of the plurality of porous particles comprises a continuous polymeric phase composed of a cellulosic polymer derived at least in part from cellulose acetate butyrate.

4. The method of claim 1, wherein each of the plurality of porous particles has a mode particle size that is a number within the range of at least 2 μm and up to and including 15 μm.

5. The method of claim 1, wherein each of the plurality of porous particles has a mode particle size that is a number within the range of at least 4 μm and up to and including 12 μm.

6. The method of claim 1, wherein each of the plurality of porous particles has a coefficient of variance of the particle size of no more than 15% compared to the mode particle size.

7. The method of claim 1, wherein each of the plurality of porous particles has a coefficient of variance of the particle size of no more than 10% compared to the mode particle size.

8. The method of claim 1, wherein each of the plurality of porous particles has an aspect ratio of at less than 0.8.

9. The method of claim 1, wherein each of the plurality of porous particles further comprises one or more colorants.

10. The method of claim 9, wherein the one or more colorants absorb radiation having a wavelength of at least 800 nm and up to and including 2500 nm of the electromagnetic spectrum.

11. The method of claim 1, wherein the plurality of porous particles comprise fine inorganic particles on the outer surfaces thereof, which fine inorganic particles have hydrophobic groups covalently bonded primarily on portions of surfaces of the fine inorganic particles positioned away from the porous particle surfaces.

12. The method of claim 1, wherein the discrete pores of the plurality of porous particles further contain a pore stabilizing hydrocolloid that is disposed at the interface of the discrete pores and the continuous polymeric phase.

* * * * *